United States Patent Office 3,639,493
Patented Feb. 1, 1972

3,639,493
DEHYDROHALOGENATION OF HALOGENATED COMPOUNDS
John B. Campbell, Hockessin, Del., assignor to E. I. du Pont de Nemours and Company, Wilmington, Del.
No Drawing. Filed Feb. 28, 1968, Ser. No. 712,896
Int. Cl. C07c *21/04, 21/20*
U.S. Cl. 260—655       5 Claims

ABSTRACT OF THE DISCLOSURE

Halogen-containing organic compounds are treated with aqueous inorganic alkaline material in the presence of a catalytic amount of a quaternary phosphonium compound to split off hydrogen halide.

BACKGROUND OF THE INVENTION

It is known to dehydrohalogenate halogen-containing compounds by reaction with aqueous alkali. Chloroprene (2-chloro-1,3-butadiene) can conventionally be prepared by dehydrochlorinating 3,4-dichloro-1-butene with an aqueous alkaline solution such as aqueous sodium hydroxide or potassium hydroxide. Such a procedure is disclosed in U.S. Pat. 2,430,016. However, these processes are characterized by relatively low reaction rates, and there has been a need for a dehydrohalogenation process with a much faster reaction rate than has heretofore been available.

DESCRIPTION OF THE INVENTION

In accordance with this invention there is provided an improvement in the aqueous process for dehydrohalogenating halogenated hydrocarbons containing at least two carbon atoms and at least one hydrogen atom. The process involves conducting the dehydrohalogenation by reaction with an inorganic alkaline material in aqueous medium in the presence of a catalytic amount of a quaternary phosphonium compound. Usually the amount of quaternary phosphonium compound will be about 0.1 to 15% by weight, based on the weight of the halogenated compound which is being dehydrohalogenated. By operating in accordance with the present invention, very substantial increases in reaction rate are obtained, as well as a reduction in the percentage of the unwanted by-products which are normally produced in aqueous dehydrohalogenation reactions, such as 1-chloro-1,3-butadiene when 3,4-dichloro-1-butene is dehydrohalogenated.

The quaternary phosphonium catalysts which can be utilized in practicing the invention process are represented by the structure

RR'R"R'"P+X− wherein R, R', R" and R'" (collectively referred to as R's) are each unsubstituted aromatic or aliphatic radicals or 2-hydroxyethyl, 2-ethoxyethyl, or alkyl-substituted phenyl radicals, or two R's are unsubstituted aliphatic radicals terminally joined to form tetramethylene or pentamethylene radicals and X− is an anion selected from chloride, bromide and iodide ions and the dimethylphosphate ion. It is preferred that at least one of said R's be an aliphatic radical which contains one to twenty carbon atoms; this radical can be saturated or unsaturated, branched or unbranched, or it can be alicyclic; two of said R's together with said phosphorous atom can form a heterocyclic ring. The R's can be substituted with aromatic rings or with functional groups such as hydroxy, alkoxy, carboxy, or sulfo groups; that is, they can be derived from alkylene oxides such as ethylene oxide or propylene oxide. While some improvement in reaction rate can be effected when the alkyl radicals contain one to four carbon atoms, the effectiveness of the catalyst is enhanced by the presence of at least one radical having a longer chain. Mixtures of said quaternary phosphonium catalysts can be used.

The anion X− can be a halide ion, such as the chloride or iodide ion, a dimethylphosphate ion, or any ion which does not interfere with the reaction and which does not promote polymerization, if, for example, the product is a polymerizable compound, such as chloroprene. Specific examples of quaternary phosphonium compounds that can be used include:

Tetrabutylphosphonium chloride
Methyltrioctylphosphonium dimethylphosphate
Benzyldimethyl(3,5,5-trimethylhexyl)phosphonium benzenesulfonate
Dodecyltrimethylphosphonium chloride
Trimethyloctadecenylphosphonium chloride
Hexadecyltrimethylphosphonium chloride
Octadecyltrimethylphosphonium chloride
Trimethyl(octadecenylphenyl) phosphonium chloride
(2-hydroxyethyl)trimethylphosphonium bromide
Triethylhexadecylphosphonium iodide
Diamylmethyl(4-ethylphenyl) phosphonium iodide
Phenylethyltetramethylene phosphonium iodide
  (the phosphorus is in the ring)
p-Tolylethylpentamethylenephosphonium iodide
  (the phosphorus is in the ring)
(2-hydroxyethyl)tributylphosphonium iodide
(2-hydroxyethyl)trioctylphosphonium iodide
(2-hydroxyethyl)diethyl (2-ethoxyethyl)phosphonium chloride
(2-hydroxyethyl)tricyclopentylphosphonium chloride
(2-hydroxyethyl)tricyclohexylphosphonium chloride The disclosure of additional phosphonium compounds (and their preparation) that can be effectively utilized in the invention process are disclosed in the following references:

Kosolapoff, Organophosphorus compounds, 1950
U.S. Patents 3,230,069 and 3,214,434.

The temperature to be used in carrying out the process of this invention can vary from about 0°C. to at least about 100° C. At temperatures below about 0° C. the reaction is undesirably slow and temperatures substantially above 100° C. are undesirable because of increased problems of polymerization and by-product formation. The most practical temperature range is from about 40° C. to about 85° C. when 3,4-dichloro-1-butene is being dehydrohalogenated to chloroprene. It is most convenient to use the autogenous pressures which develop normally under the reaction conditions. Higher or lower pressures can be used if desired.

The reaction is carried out in the absence of oxygen to avoid subsequent reactions of the dehydrohalogenated product formed. Also, it is highly desirable to add polymerization inhibitors such as phenothiazine, alkyl nitrites, nitroso compounds or other compounds which inhibit polymer formation if the reactants or products are polymerizable.

The alkaline material used in the process of this invention can be any alkaline material which is capable of effecting a dehydrohalogenation by reaction with a halogenated compound in aqueous medium. Alkali metal hydroxides are preferred in the carrying out of the process of this invention. Sodium hydroxide is particularly preferred because of its ready availability. Other hydroxides which can be used include potassium hydroxide, lithium hydroxide, rubidium hydroxide and cesium hydroxide. Alkaline earth metal hydroxides such as calcium and barium hydroxides can also be used.

The hydroxide is preferably used as an aqueous solution and the concentration of hydroxide in the solution can vary over a wide range, for example, from about 2% up to a saturated solution. The quaternary phosphonium compound catalysts are most effective at alkali metal hydroxide concentrations maintained from about 15% up to a saturated solution.

The mole ratio of hydroxide to halo-compound can be as low as about 0.5:1. The optimum mole ratio of reactants to use will vary with the effectiveness of the phosphonium compound being employed as catalyst and the reactivity of the compound being dehydrohalogenated. Within the mole ratio range of 0.5:1 to 20:1 the higher mole ratios are needed with the less active catalysts and reactants. The upper limit of the mole ratio is not critical. In general, there is no advantage in using mole ratios above 20:1.

The process of this invention is generally applicable to the dehydrohalogenation of halogenated aliphatic hydrocarbons containing at least two carbon atoms and at least one hydrogen atom and is particularly useful for the preparation of chloroprene from 3,4 - dichloro-1-butene and preparation of 2,3 - dichloro - 1,3-butadiene from 2,3,4 - trichloro-1-butene or 1,2,3,4 - tetrachlorobutane. Representative halogenated aliphatic hydrocarbons which can be dehydrohalogenated include chlorocyclohexane, chlorocyclohexane as well as the corresponding polychloro substituted cyclohexanes and cyclohexenes, tetrachlorobutene, ethyl chloride, dichloroethane, trichloroethane, tetrachloroethane and pentachloroethane, 1,4 - dichloro-2-butene, 2-chloro-1,3-butadiene, 1 - chloro-1,3 - butadiene, propyl chloride, butyl chloride, amyl chloride and the corresponding polychloro analogs of these compounds.

These compounds can be saturated or can contain one or more sites of non-aromatic unsaturation. Preferred are ethylenically unsaturated halogenated hydrocarbons such as 3,4-dichloro-1-butene in which the hydrogen which is to be removed by the dehydrohalogenated reaction is attached to the α-carbon atom relative to the double bond. Normally the latter will involve the splitting off of a single HCl molecule.

The process can be carried out by either a batch or a continuous process. The product formed can be recovered by conventional techniques. In producing chloroprene, for example, the reaction mass can be removed as a liquid, the aqueous and organic phases can be separated by conventional methods, and the chloroprene can be separated from dichlorobutene by distillation. Other methods will be within the scope of one skilled in the art.

Although the invention is illustrated by the dehydrochlorination of chlorine-containing compounds for convenience and because these are the most readily available halogen compounds, it is equally useful for splitting off hydrogen bromide, hydrogen iodide and hydrogen fluoride from the corresponding bromine-, iodine- and fluorine-containing compounds.

The following examples are representative and illustrate the invention process. All parts, percentages and proportions are by weight unless otherwise indicated.

EXAMPLES 1–7

A series of experiments is carried out using the following procedures and conditions as set forth in Table I.

The reactor is a flask fitted with an agitator, reflux condenser, and an adaptor fitted with a serum cap for withdrawing samples. Air is flushed from the flask with nitrogen, and an atmosphere of nitrogen is maintained in the reactor. The specified temperature is controlled by a steam bath. The sodium hydroxide (the alkaline material), at the specified concentration, is introduced into the flask and brought to a reaction temperature of 60° C. 3,4 - dichloro-1-butene containing about 0.005% phenothiazine and the specified concentration of each catalyst is then introduced into the flask through a stoppered glass joint. At the end of the specified reaction time, agitation and temperature control are discontinued. Samples of the organic phase are withdrawn, washed with water, and analyzed by vapor phase chromatography. Area percent analyses are converted to mole percent values from predetermined calibrations. The formula for percent conversions of dichlorobutene is:

$$\text{Percent conversion} = \frac{\text{Moles of chloroprene}}{\text{Moles of chloroprene plus moles of unreacted dichlorobutene}} \times 100$$

The 3,4 - dichloro-1-butene used is 97–98% pure. Molar amounts are not corrected for impurities. The concentration of sodium hydroxide is based on weight of sodium hydroxide plus the weight of water. The concentration given in the table is the concentration of the sodium hydroxide solution initially charged to the reactor. Percentage of catalyst is based on the weight of 3,4-dichloro-1-butene (DCB). The table summarizes the examples and comparisons.

Similarly effective results are achieved in the representative examples on substitution of corresponding quaternary phosphonium compounds as heretofore described.

TABLE

| Example | Catalyst | Catalyst conc., percent | NaOH conc., percent | Mole ratio, NaOH/DCB | Time, min. | Temp., °C. | Conversion percent |
|---|---|---|---|---|---|---|---|
| 1 | Tetrabutylphosphonium chloride | 5 | 20 | 1.1 | 30 | 60 | 83.2 |
| 2 | do | 1 | 20 | 1.1 | 30 | 60 | 44.1 |
| 3 | do | 1 | 20 | 1.1 | 30 | 20 | 13.1 |
| 4 | do | 0.1 | 20 | 1.1 | 30 | 60 | 16.9 |
| 5 | do | 5 | 50 | 10 | 10 | 60 | 100 |
| 6 | Methyltrioctylphosphonium dimethylphosphate | 5 | 20 | 1.1 | 30 | 60 | 71.5 |
| 7 | do | 5 | 50 | 10 | 10 | 60 | 100 |
| Control | None | 0 | 20 | 1.1 | 30 | 60 | 5.6 |
| Control | None | 0 | 50 | 10 | 30 | 60 | 2.6 |

The embodiments of the invention in which the exclusive property or privilege is claimed are as follows:

1. In a process for dehydrochlorinating a chlorinated aliphatic hydrocarbon selected from the group consisting of 3,4-dichloro-1-butene; 2,3,4-trichloro-1-butene; and 1,2,3,4-tetrachlorobutane, by reacting said chlorinated hydrocarbon with an aqueous solution of an alkali metal hydroxide, the improvement of carrying out the reaction at a temperature within the range of 40 to 85° C. and at an alkali metal hydroxide:chlorinated hydrocarbon mole ratio of from 0.5:1 to 20:1, in the presence of about 0.1 to about 15% by weight based on the weight of said chlorinated hydrocarbon, of a quaternary phosphonium compound having the structure R'R''R'''P+X− wherein said R, R', R'' and R''' are each 2-hydroxyethyl, 2-ethoxyethyl, alkyl-substituted phenyl, unsubstituted aromatic or unsubstituted aliphatic radicals or two R's are unsubstituted aliphatic radicals terminally joined to form tetramethylene or pentamethylene radicals, at least one R being an aliphatic radical of 1 to 20 carbon atoms, and X− is an anion selected from chloride, bromide and iodide ions and the dimethyl phosphate ion.

2. The process of claim 1 wherein said phosphonium compound is present in an amount of from 1 to 5%.

3. The process of claim 1 wherein said chlorinated aliphatic hydrocarbon is 3,4-dichloro-1-butene.

4. The process of claim 1 wherein R, R', R" and R'" of said phosphonium compound are aliphatic radicals.

5. The process of claim 1 wherein said quaternary phosphonium compound is tetrabutylphosphonium chloride.

References Cited

UNITED STATES PATENTS

| | | | |
|---|---|---|---|
| 2,430,016 | 11/1947 | Hearne et al. | 260—655 |
| 2,999,888 | 9/1961 | Crocker et al. | 260—655 |
| 3,413,365 | 11/1968 | Sennewald et al. | 260—654 D |
| 3,435,083 | 3/1969 | Baader et al. | 260—655 |

BERNARD HELFIN, Primary Examiner

J. A. BOSKA, Assistant Examiner

U.S. Cl. X.R.

260—654 D, 648 R